May 11, 1926.
R. BROWNSON ET AL
1,583,776
ROAD PLANER
Filed Dec. 1, 1921  4 Sheets-Sheet 4
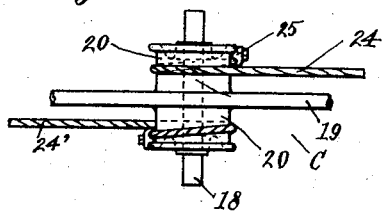
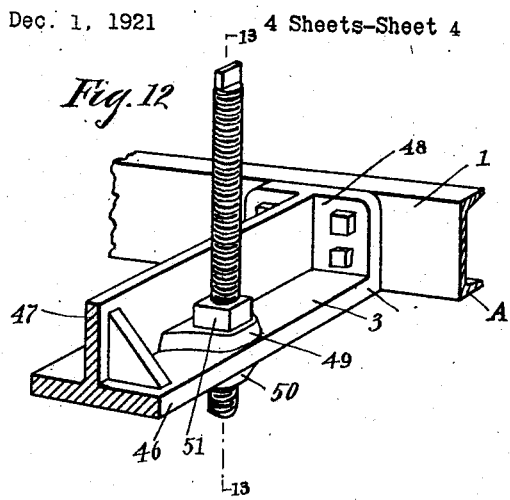
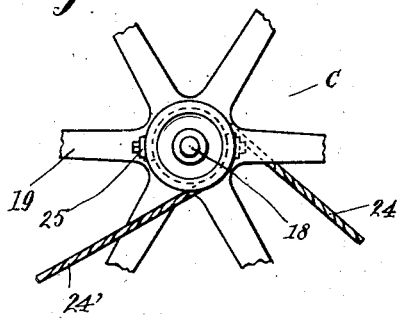
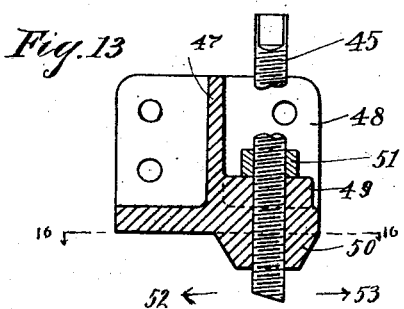
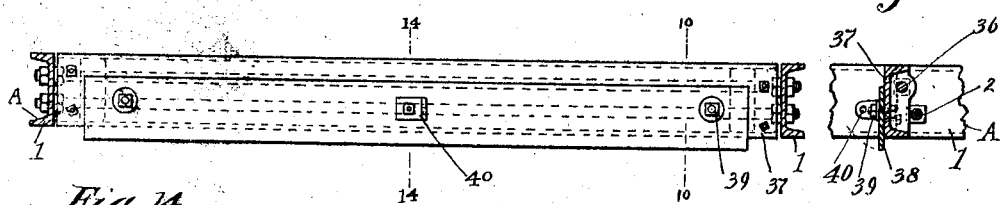
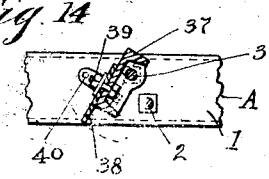
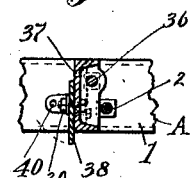
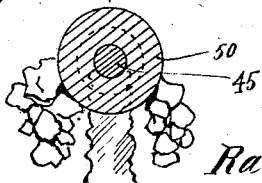
Inventors,
Ralph Brownson
Theodore A. Brownson
by H. S. Johnson
Attorney.

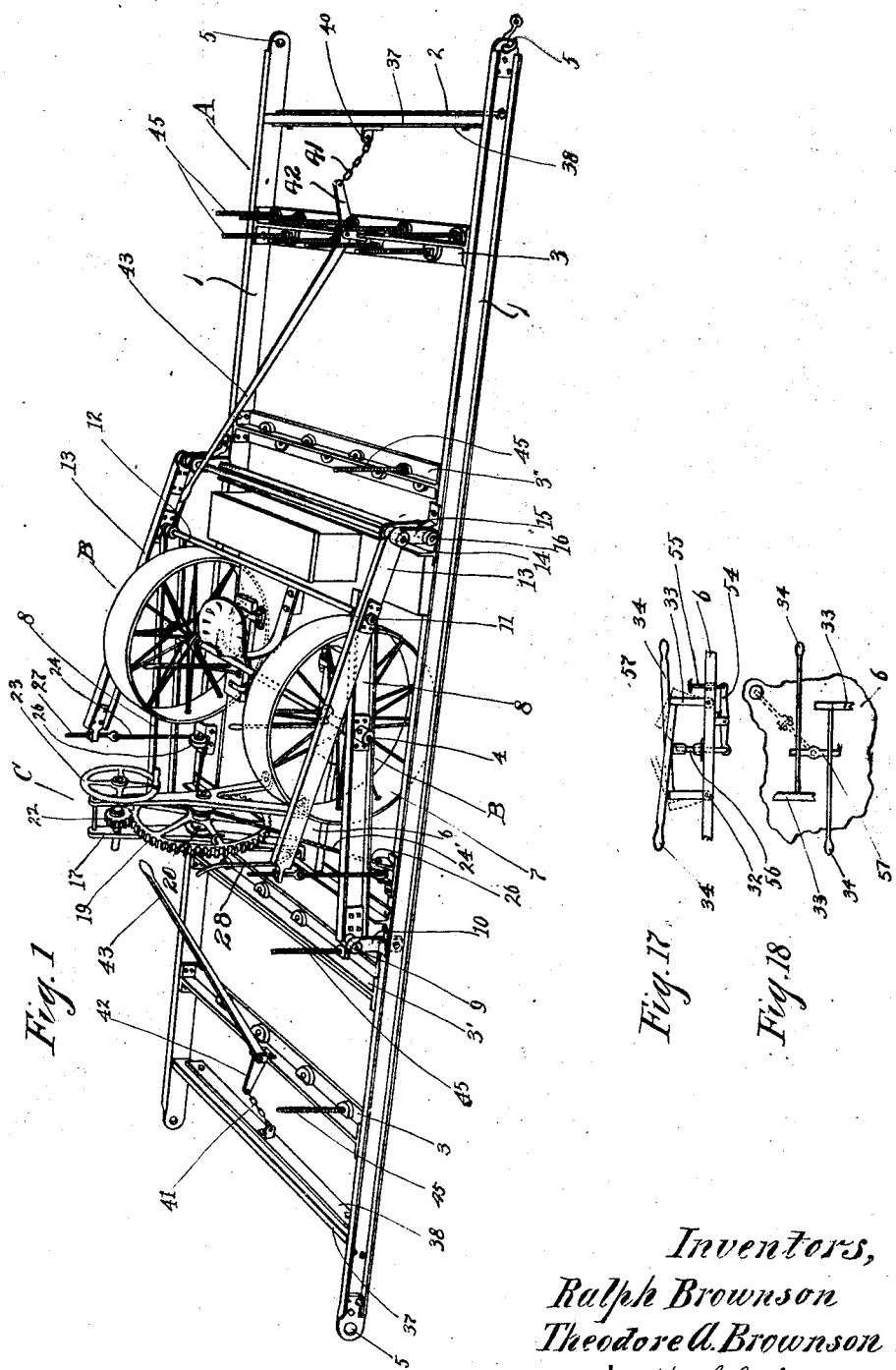

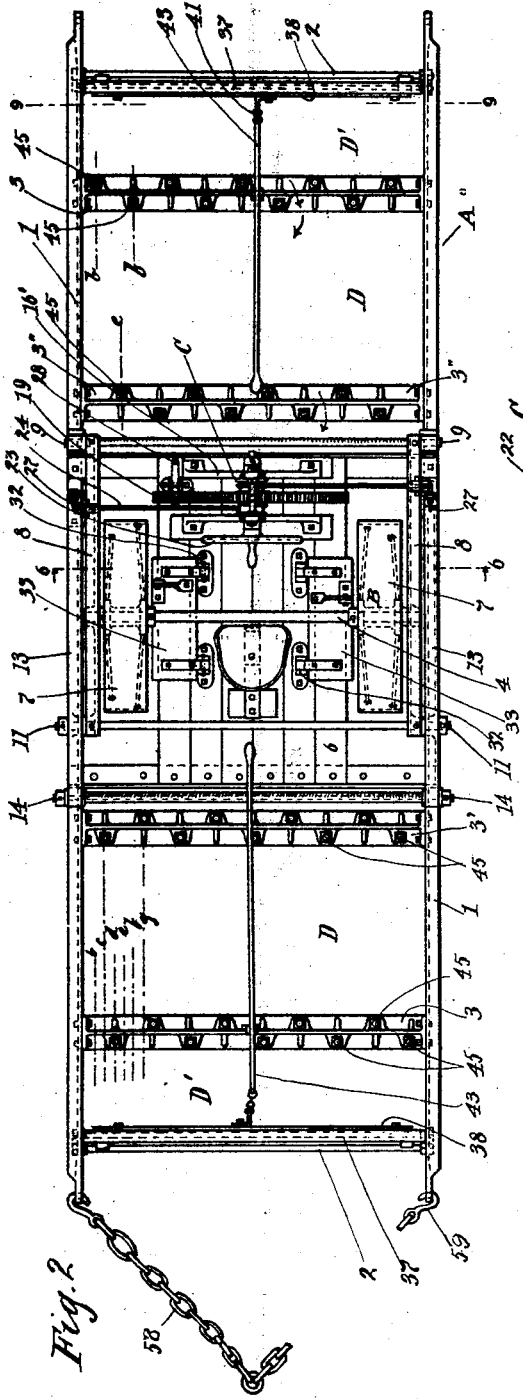

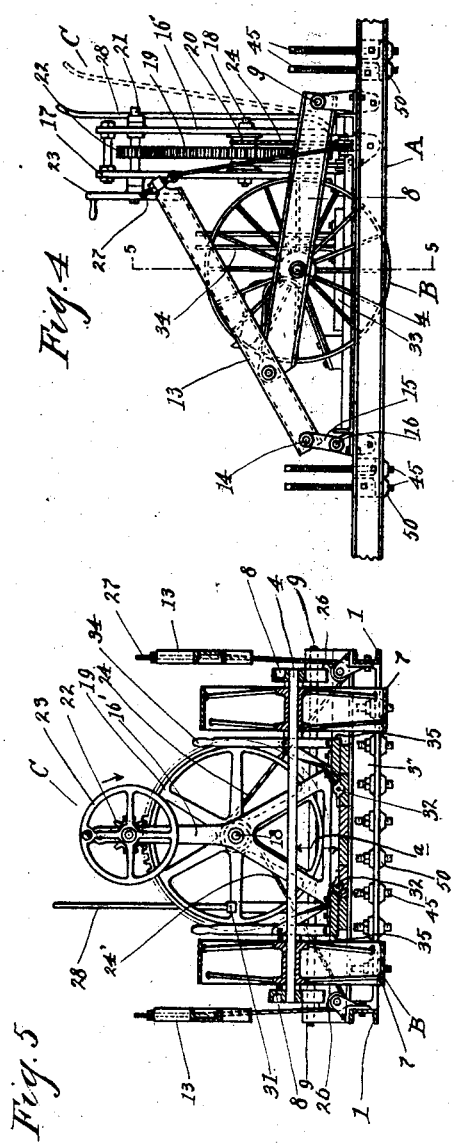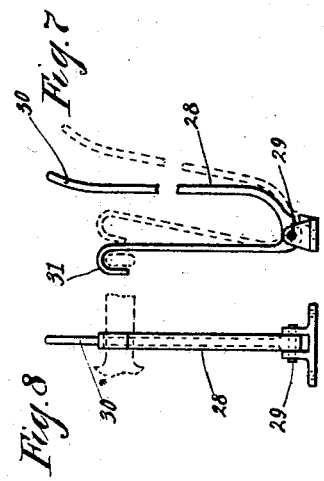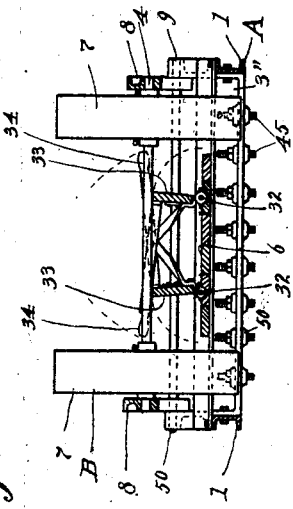

Patented May 11, 1926.

1,583,776

UNITED STATES PATENT OFFICE.

RALPH BROWNSON AND THEODORE A. BROWNSON, OF HASTINGS, MINNESOTA, ASSIGNORS TO R. BROWNSON & COMPANY, OF HASTINGS, MINNESOTA, A CORPORATION OF MINNESOTA.

ROAD PLANER.

Application filed December 1, 1921. Serial No. 519,104.

This invention relates to road planing or scarifying machines, and has for one of its objects to provide a device, whereby the abnormal contiguous waves or undulations in the road, may be planed off, under the control of a long unbroken straight runner so that the crests of two or more waves may be simultaneously subjected to a planning action, thereby surfacing the road to nearly its original contour, whether the contour be straight or of irregular curvature.

Road planers designed to be dragged on runners, and having transversely arranged teeth extending below the runners and arranged at one particular point intermediate the ends of the runners cannot be guided by the runners as a straight edge, to cut parallel to the original contour of the road, because as each hillock or wave crest is cut off, the trailing portion of the runners, ride more or less on the rubble left behind, sometimes cutting into the rubble, and at other times riding over the top thereof, thus causing the cutting action of the teeth to constantly vary.

Where a single group of teeth or cutters are employed as in the machine just referred to, the front end of the planer, is either lifted from the ground, or rides on the hillock ahead of the teeth, often lifting the knives entirely out of contact with the ground. By having relatively long runners, and the groups of teeth separated an appreciable distance on the underside of the runners, the entire device may at times be supported entirely on two or more groups of teeth, so that two or more high places in the road will be cut at the same time. Obviously, the resultant cut of the several groups of teeth will more nearly approach the original contour of the road, than would the vacillating cut made by a single group of teeth at the center of a long frame.

It is a further object of the invention, to provide a planer which will be relatively long and have a purality of spaced groups of cutting elements, controlled as to depth, by a pair of runners flush with the under side of the frame, so that an abnormally high hillock may be subjected to several cutting operations in traveling the length of the machine.

The operation of a short planer, equipped with a single group of cutters, as compared to the present invention, may be likened to the operation of hand planes used by a mechanic. The mechanic, in practice, when it is desired to straighten the crooked edge of a board, ordinarily uses the jack-plane, which is used to rough down the high places; he then, according to common practice, uses a fore-plane, which is appreciably longer than the jack plane, to render the edge perfectly straight.

The reason the jack plane isn't used for final straightening is because it is so short that it tends to cut deeper in spots and thus produce inaccurate work, while the foreplane, being appreciably longer will cut the high places only, though it may require more strokes and longer time.

In applicants' road planer, the cutters may be set and not changed for both roughing and finishing, the device being so efficient that it affords many economic advantages, even though an extra cutting action may be necessary.

A further object of applicants' invention is to provide a long planer, having a plurality of groups of teeth, for the purpose of expediting the work and enabling a relatively small bite to be taken in the process of planing.

A still further object of providing a plurality of separate groups of teeth, is to prevent side-swiping of the machine, as often occurs on planers having but a single cutting element. This side-swiping, is the result of the teeth at one side of the machine, meeting with greater resistance than the teeth on the opposite side, thus, tending to swing the entire machine bodily in a horizontal plane. By having two or more groups of teeth, side swiping rarely occurs, because one group serves as an anchor to prevent the machine from rotating around the other group.

A still further object of the invention is the provision of a planer of the class described, which is adapted to be run in either direction without turning the machine around, and which is equipped with a truck, connected by vertically yieldable connecting mechanism, in such a manner as to be capable of being raised bodily from the ground and thereby be supported by said truck, whereby it may be transported from place to place, and having means, whereby said truck mechanism may be utilized as ballast when it is desired to have greater downward pressure on the teeth.

It is a further object of the invention to provide planer teeth, which will require no special sharpening at all, can be readily and conveniently adjusted as to depth, by unskilled attendants, and can be made of bars of relatively small cross section, owing to the novel construction of the support in which they are mounted.

Other objects of the invention will appear throughout the specification, the invention consisting in the construction, combination and arrangement of parts hereinafter described and claimed. In the accompanying drawings forming part of the specification:

Figure 1, represents a road planer embodying my invention,

Figure 2, is a plan view of same.

Figure 3, is a side elevation, showing the planing frame supported on the truck.

Figure 4, is a fragmentary side elevation of my improved planer, showing two groups of cutting teeth in operative position, and the truck riding as a trailer over the ground.

Figure 5, is a vertical sectional view on line 5—5 of Figure 4.

Figure 6, is a vertical sectional view on line 6—6 of Figure 2.

Figure 7, is a side view of the locking lever forming part of the raising and lowering mechanism.

Figure 8, is an end view of same.

Figure 9, is a sectional view on line 9—9 of Figure 2.

Figure 10, is a sectional view on line 10—10 of Figure 9.

Figure 11, is a fragmentary view of part of the raising and lowering mechanism.

Figure 12, is a fragmentary perspective view of part of the planing frame showing one of the cutting teeth.

Figure 13, is a vertical sectional view on line 13—13 of Figure 12.

Figure 14, is a vertical sectional view on line 14—14 of Figure 9, showing the scraper blade in upswung position.

Figure 15, is a side view of Figure 11.

Figure 16, is a sectional view on line 16—16 of Figure 13, showing the manner in which the road is broken away by impact with the boss on the underside of the planing frame.

Figure 17, is a side elevation of the truck raising mechanism, and

Figure 18 is a plan view of same.

The invention comprises (Fig. 1), a road planing frame A, a truck B, and raising mechanism C for raising said planing frame. The planing frame A, comprises relatively long side rails 1, preferably formed of channel iron, said side rails being parallel and held spaced by the spreader rods 2, located adjacent the ends of the frame.

Intermediate said rods, the side rails are firmly connected by the cross beams 3—3, 3′ and 3″, of which we employ four in the machine shown. These cross beams are spaced symmetrically on either side of the axle 4, which latter, is disposed transversely of the frame and preferably midway between the ends thereof. The ends of the side rails, which are disposed on edge, are rounded to form runners and are formed with an eye 5, to receive the hook of a hitching chain. Between the cross beam 3′ and 3″ the frame is constructed with a platform 6, which is cut away at opposite sides to form an opening, through which extend the supporting wheels 7, said wheels being preferably rotatably mounted on the axle 4, the latter extending above and across the platform 6, the wheels being of a diameter, to afford a relatively wide space $a$ (Fig. 5) between the platform and the axle.

While we have shown the wheels located inside the rails 1, we may extend the axle and mount them on the outside of the rails. As shown, the outer ends of the axle are firmly secured in the arms 8, the latter having pivotal connection 9, in the brackets 10. The pivots 9, in said brackets are positioned above the side rails 1, to which said brackets are firmly secured.

The arms 8, extend beyond the axle 4, and have pivotal connections 11, by means of the cross rod 12, with the fulcrumed levers 13. The short arms of said levers have pivotal connections 14, with the vertical compensating links 15, said links having pivotal support 16, on the side rails 1. The long arms of the levers 13 extend over and beyond the axle 4, preferably in vertical alinement with the side rails 1, the outer free ends, thereof, being located adjacent the pivotal supports 9, of the arms 8, and between said pivotal support and the wheels.

Obviously, a downward pull at the outer end of said lever will rotate the arms 8 about the axle 4, thereby exerting an upward pulling force on the pivots 9, and 14, whereby the frame will be raised from the ground. Thus, the pivots 14, constitute the fulcrums of the levers 13, and the axle 4 constitutes the fulcrum of the arms 8.

For the purpose of actuating the levers 13, the raising and lowering mechanism C is provided. The mechanism C, comprises a housing formed in part, of frame members 16′ and 17, wherein is mounted in parallelism with the side rails 1, the shaft 18 Rotatably mounted on the shaft, is the spur gear 19, positioned preferably midway between the housing members 16 and 17, said gear being formed on opposite sides with winding drums 20. Mounted in the housing above said gear, parallel with the shaft 18, is the shaft 21 upon which is rigidly mounted the pinion 22, which meshes with the spur gear 19, said shaft carrying at its outer free end a hand wheel 23, whereby when it is actuated, the drums 20 may be revolved. Secured, one to each of the drums, are the cables 24 and 24', said cables being attached to the drums by means of the clips 25 (Fig. 11), said cables being wound in opposite directions on said drums, so that a turning movement of the spur gear will either wind or unwind said cables as the case may be. The cables extend from the drums, respectively, to the side rails, and to the respective pulleys 26, which latter are mounted on the upper edge of the side rails, said cables then extending upwardly and having connection at their upper ends with the eye bolts 27, which latter extend vertically through the outer ends of the levers 13, and are threaded at their outer ends to receive nuts whereby the cables may be adjusted to vary their lengths. Thus, when the hand wheel 23 is rotated in a direction opposite that indicated by the arrow, (Fig. 5) the cables will be caused to unwind, thereby causing the levers 13 and the arms 8 to be actuated, inasmuch as the weight of the planer frame is supported by said levers and arms.

The frame may in this manner be lowered until it rests upon the ground, it being intended that the cables be permitted to slacken slightly so that when the planer frame, is caused to be dragged bodily over the ground, the supporting wheels 7, will cease functioning as a frame support, but will still support the lever and arms 13 and 8, said levers and arms being free (owing to the slack in the cables) to move upon their pivots in response to the irregular vertical movement of the wheels over the ground.

The wheels B, the axle 4, and the arms and levers 13 and 7 may be termed collectively a truck, the arms and levers constituting the side rails of the frame of the truck and each of said rails may be said to consist of a pair of fulcrumed levers, one being fulcrumed on the swinging end of the other, as for instance the levers 13 having pivotal connections 11, on the outer swinging ends of the arms 8, both of said levers being pivotally connected at their lifting ends to the planer frame, as by means of the pivots 9 and 14.

For the purpose of holding the planer frame in raised position the locking lever 28 is provided. This lever is supported on the platform 6 by means of a bracket supporting the pivot 29, and is preferably U-shaped, one leg of the U constituting an operating lever 30, and the other leg thereof being formed with a hook 31, adapted to hook over any selected arm of the spur gear 19, as is best shown in Figures 1 and 5 of the drawings. Thus, as stated in the foregoing, the truck will trail within the frame, the wheels thereof riding over the planed surface when they are mounted as shown, or upon the outside of the rails when they are mounted upon the outside of the frame. It frequently occurs, however, that a greater downward pressure is desirable, as for instance on hard shale roads.

For the purpose of meeting this situation, means is provided whereby the pressurue on the ground due to the weight of the truck may be conveniently and readily transferred to the frame.

As described in the foregoing, the construction shown, affords a space $a$ between the axle and the platform 6. Hinged in this space, under the axle 4, by means of the hinges 32, so as to swing in a vertical transverse plane with respect to the planer frame, are the cam plates 33 said cam plates lying flat upon the platform and having upwardly extending operating levers 34, whereby said cam plates may be swung upwardly upon their hinges.

The distance from the outer edge 35 of the cam plates, to the pintle of the hinge 32, is sufficiently greater than the space $a$ to effect a raising of the wheels and the axle from the position shown in Figure 5, to the position shown in Figure 6, (wherein the peripheries of the wheels are shown raised above the under side of the planer frame) when the cam plates are moved from the position shown in Figure 5, to the position shown in Figure 6, wherein the cam plates are shown in vertical position. Obviously, the edge 35, engages the underside of the shaft 4 and cams it upwardly when the cam plates are moved into vertical position, or on dead center, whereby the wheels are raised from the ground. Thus, the weight of the truck is shifted from the ground to the planer frame.

For the purpose of conveniently throwing the levers off dead center, foot actuated tripping mechanism is provided. This tripping mechanism consists of a rocking beam 54, pivoted on the underside of the platform 6, one end thereof having pivotally mounted thereon a tread spindle 55, extending vertically through the platform beyond the top side thereof. At opposite end of the beam is pivotally mounted the vertical standard 56, carrying at its top the cross bar 57, which latter extends underneath the levers 34 and beyond opposite sides thereof, so that when the fulcrumed beam is actuated, the bar 57 will raise the levers and throw them off of dead center. Thus, the truck will be readily lowered to the ground without requiring the operator to leave his position at the winch. In Fig. 5, the locking lever 28 is shown in engagement with an arm of the spur gear, for the purpose of illustrating the manner of locking the planing frame in elevated position, though Figs. 4 and 5 illustrate the positions the parts assume, when the truck is riding on the ground, at which time the locking lever is out of engagement with the spur gear, as the cables are supposed to be slightly slackened as stated in the foregoing.

In Fig. 1, of the drawings, the planer frame is slightly elevated from the ground, the locking hook being shown in engagement to hold the frame elevated. The cross rod or strut 2, of the planer frame, is firmly secured in the webs of the side rails adjacent the lower leg of the channel as shown in Fig. 10. Spaced inwardly from and located above said rod, and extending parallel therewith, is the rod 36, which constitutes the pintle upon which is rotatably mounted the scraper supporting beam 37, upon which the beam may be swung as shown in Fig. 4. The rod 2 constitutes a stop, against which the beam rests when the beam is in vertical position. A scraper blade 38, secured to the beam, by means of the bolts 39, extends beyond the lower face of the planer frame, and functions as a scraper to scrape the surface of the road, after it had been planed by the teeth in advance of the blade. Centrally, the blade is provided with a perforated lug 40, to which is attached a pull chain 41, connected to the outer end of the short arm 42 of the fulcrumed lever 43, the fulcrum 44 of said lever, being supported on the cross beam 3. By the operation of the lever, the scraper blade may be swung upon its pintle to inoperative position. As shown, a scraper blade of substantially similar construction is provided at both ends of the planer frame, so that when the planer is being operated in one direction, the forward blade will trail over the ground, while the rear blade will scrape the road. The cutting or planing elements of the machine, consist of a plurality of vertically disposed teeth 45, distributed throughout the length of the planer frame, and, in the machine shown, are divided into four groups, each of the beams 3—3, 3' and 3" supporting one of the groups. In Figs. 12 and 13, the beam 3, here shown, is typical of all the cross beams 3—3, 3' and 3", the beam consisting of a flat horizontal web 46, having a vertical longitudinal central rib 47, the beam being bolted firmly to the side rails 1, by means of bolts in the end flanges 48.

Spaced uniformly throughout the length of the beam, and alternately on opposite sides of the web 47, are the bosses 49, each boss having a corresponding boss 50 in alinement on the underside of the web 46, said boss being conic and circular, whereby a considerable thickness is secured through which the teeth 45 extend. The teeth are threaded throughout their length and are threadedly fitted to be screwed through said bosses on the beam. The teeth are preferably formed of a round bar steel and are cut away at the upper extremities to form two parallel sides adapted to be gripped by an ordinary wrench whereby the tooth may be screwed through the beam to project beyond the underface of the conic boss, as desired. The lock nut 51 is provided whereby the teeth may be firmly set against rotary movement in the beam.

In the full sized machine which we have constructed, and successfully operated, we have found, that teeth an inch in diameter threaded throughout their length, and projecting an inch or more beyond the face of the boss tears up the high places in a very effective manner, especially in roads of long standing, where the surface is hard and rocky.

We have found, however, that a thicker rod, whether square or round, would not operate as efficiently as a rod of smaller size. Obviously, for work of this nature the minimum size of the rod is limited because of its tendency to bend under the strain. We have used inch rods without the boss 50 on the under face of the beam, and found a tendency for the rods to bend under severe conditions, unless the projection of the tooth below the beam was limited to approximately an inch. This, however, afforded insufficient clearance between the beam and the planed surface. In order to enable us to use a rod of small diameter and still secure the clearance between the beam and the planer surface, we have provided the boss 50, and we have found that a projection of an inch or less beyond the under face of the boss is sufficient for practically all conditions. We also, found that the conic bosses, break away the sides of the ragged groove which the tooth plows in the surface of the road, somewhat after the manner shown in Figure 16, and that the tooth no longer tends to bend.

Thus, we have found that the boss not only prevents the teeth from bending, and permits a tooth of smaller cross section to be used, but also acts as a buffer, to rip up the edges of the grooves made by the teeth.

After planing a mile of road we found that the teeth wore off at the ends to approximately the angle indicated in Figure 13, the machine having been driven in the direction indicated by the arrow 52. Obviously, when the machine is operated in the opposite direction as indicated by the arrow 53, the tooth is automatically sharpened for the occasion, as the clearance is in the proper direction. Thus, we have found, that the teeth have worn uniformly in both directions, thereby requiring no sharpening whatever at any time, until the entire length of the tooth has been worn away. A new tooth is then easily and quickly substituted. This is a very important feature of my invention, as it involves a reduced cost of maintenance, and has proved much more satisfactory and efficient in planing a road than have sharpened picks which are sometimes used in machines of this class.

Our improved teeth are made of tough steel and are properly case hardened and are cheap of construction. The teeth are distributed widthwise of the machine upon the several beams in a manner, as to assign to each individual tooth an unplaned portion of the road. This we accomplish by disposing the teeth on the several beams in alternating relation. In Figure 2, the lines $b, c, d, e, f$ and $g$ indicate the lines of travel and the first six teeth counting from the right hand side rail 1. Thus, $b$ represents the line of travel of the first tooth in the rear cross beam 3, $c$ the first tooth in cross beam 3', $d$ the first tooth in the forward cross beam 3, $e$, the first tooth of the cross beam 3'', if the second tooth in the rear cross beam 3, $g$ the second tooth in the cross beam 3', and so on across the entire width of the machine.

The teeth on each beam as shown are staggered, whereby the broken material is enabled to escape between the bosses as indicated by the arrows in Figure 2.

As shown in Figure 9, the scraper blades 38 extend only to the outer tooth $b$ of the rear cross beam. A suitable draw chain 58, provided with hooks 59, whereby it may be attached to either end of the side members, is provided. Thus, in operation the machine may be transported when the parts are in the position shown in Figure 3. When it is properly positioned on the road for action, the planer frame is lowered until it rests upon the ground, the truck trailing as will be hereinafter described.

When a particularly hard and tough portion of the road is encountered, the truck may be elevated, as described in the foregoing so as to bear down upon the planer frame to apply greater downward pressure on the teeth. When the end of the run is arrived at, the chain is shifted to the opposite end of the machine when it is again ready for action.

The rectangular spaces or openings D and D', formed at opposite ends of the frame, between the cross beams, the scraper blades, and the side rails 1, constitute enclosures, wherein accumulate the scrapings and the larger particles planed from road surface. The larger stones, which cannot pass under the cross beam, accumulate in the enclosure D, while the smaller particles such as gravel, will accumulate in the enclosure D'.

These accumulations will be automatically distributed inasmuch as the material will fall into the low places in the road, such as deep wheel ruts and wash-outs, while the scrapers will level these spots to render the surface uniform. If the accumulation in D' becomes too extensive, the scraper blades may be raised by means of the levers 43, whereby the gravel may be deposited, in an orderly manner in the road to be removed later.

By distributing the teeth approximately symmetrical about the center of the machine, the work to be done by the tractor, to effect a planing operation, is rendered uniform for both directions of travel. By the use of the associated fulcrumed levers 8 and 13, the leverage is compounded, to render the raising mechanism C (which may be termed a winch) easy of operation, said levers constituting vertically yieldable connections between the truck and frame.

By disposing the teeth substantially at right angles to the flat underside of the frame, the teeth will always present, initially upon the return trip, a cutting edge that is worn to approximately the same angular clearance, as is best shown in Fig. 13.

By being able to use a tooth of small cross section we are enabled to cut asphalt roads in fairly warm weather when the asphalt is quite sticky. The small diameter of the teeth prevents accumulation of the soft asphalt and appears to strip off in chunks when it accumulates, which would not be the case in a tooth of large diameter.

We claim:

1. A road planer, comprising elongated planing frame, adapted to be drawn lengthwise over the ground to effect a planing operation, a truck support for said frame located intermediate the ends thereof, and having vertically yielding connections with the frame, a winch operatively connected to said yielding connections and the frame whereby when said winch is actuated the frame may be bodily elevated and lowered, and means for supporting the winch on the platform to enable the latter to move therewith.

2. In a road planer, the combination with an elongated planing frame adapted to be dragged lengthwise over the ground to effect a planing operation; of a truck normally forming the sole rolling support for said frame and being located intermediate the ends thereof and having vertically yielding connections with the frame, means operatively connected with said yielding connections and said frame for arbitrarily lowering the latter bodily into engagement with the ground to be wholly supported thereon, and raising and holding mechanism independent of said means, for raising and holding said truck out of engagement with the ground.

3. A road planer comprising an oblong frame adapted to be drawn lengthwise over the ground to effect a planing operation, means including lifting mechanism located intermediate the ends of said frame extending to the ground, for moving said frame bodily vertically, and separate groups of cutting teeth extending from the underside of said frame and laterally across the latter, said groups being distributed symmetrically on said frame with respect to said means.

4. A road planer, comprising, in part, an oblong frame adapted to be drawn lengthwise over the ground to effect a planing operation, separate groups of cutting teeth on the underside of said frame, said groups being distributed symmetrically about a transverse axis located approximately midway between the ends of said frame, and a scraper blade at each end of the frame for scraping the road in the trail of said teeth, said scraper blades having yielding connections with the frame whereby they are rendered operative to scrape, only when the frame is drawn in one direction.

5. A road planer, comprising in part, a frame having a flat underside, adapted to be drawn lengthwise in either direction over the ground to effect a planing operation, and cutting teeth extending from the underside of the frame into engagement with the ground, each of said teeth consisting of a bar screw-threaded throughout its length and having threaded engagement with the frame so as to stand substantially at right angles to the underside thereof for the purpose of causing the cutting ends of the teeth to wear off at an angle relative to the longitudinal axis of the teeth which will be approximately uniform for both directions of travel of the frame.

6. A road planer, comprising in part, an oblong planing frame having flat underside adapted to be drawn over the ground to effect a planing operation, cutting teeth extending from the under side of the frame into engagement with the ground, each of said teeth consisting of a rod of relatively small cross section, and having mounting on said frame, whereby it may be arbitrarily gradually moved toward the ground, and a boss for each tooth extending rigidly below the under side of the frame and firmly surrounding the tooth to reinforce the latter against bending, whereby to enable the use of a tooth of relatively small cross section.

In testimony whereof we affix our signatures.

RALPH BROWNSON.
THEODORE A. BROWNSON.